(12) United States Patent
Ezzat et al.

(10) Patent No.: US 9,662,811 B2
(45) Date of Patent: May 30, 2017

(54) SELF-FIXTURING METALLIC COMPOSITE LAMINATE

(71) Applicant: GM Global Technology Operations LLC, Detroit, MI (US)

(72) Inventors: Hesham A. Ezzat, Troy, MI (US); Joseph M. Polewarczyk, Rochester Hills, MI (US); Bhavesh Shah, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 14/589,252

(22) Filed: Jan. 5, 2015

(65) Prior Publication Data

US 2016/0193811 A1   Jul. 7, 2016

(51) Int. Cl.

| | |
|---|---|
| *B29C 43/00* | (2006.01) |
| *C08J 5/00* | (2006.01) |
| *B29C 43/20* | (2006.01) |
| *B32B 7/06* | (2006.01) |
| *B32B 15/14* | (2006.01) |
| *B32B 1/00* | (2006.01) |
| *B32B 3/26* | (2006.01) |
| *B29C 70/00* | (2006.01) |
| *B29K 105/12* | (2006.01) |
| *B29K 63/00* | (2006.01) |
| *B29K 105/24* | (2006.01) |
| *B29L 9/00* | (2006.01) |

(52) U.S. Cl.
CPC .......... *B29C 43/003* (2013.01); *B29C 43/206* (2013.01); *B29C 70/00* (2013.01); *B32B 1/00* (2013.01); *B32B 3/26* (2013.01); *B32B 7/06* (2013.01); *B32B 15/14* (2013.01); *C08J 5/005* (2013.01); *B29K 2063/00* (2013.01); *B29K 2105/12* (2013.01); *B29K 2105/24* (2013.01); *B29L 2009/003* (2013.01); *B32B 2250/03* (2013.01); *B32B 2260/021* (2013.01); *B32B 2260/046* (2013.01); *B32B 2307/748* (2013.01); *C08J 2363/00* (2013.01)

(58) Field of Classification Search
CPC ..... B32B 15/092; B32B 7/12; B32B 2250/03; B29C 43/003; B29C 43/206; C08J 5/005; C08J 2363/00; B29L 2009/003; B29K 2063/00; B29K 2105/12; B29K 2105/24
See application file for complete search history.

(56) References Cited

FOREIGN PATENT DOCUMENTS

DE    102011051871 A1    1/2013

OTHER PUBLICATIONS

Syrett, J.A., et al.; Polymer Chemistry, 2010, p. 978-987.*
Lanzara, G., et al.; Nanotechnology, 2009, vol. 20, p. 1-7.*
German Office Action dated Dec. 20, 2016; Application No. 10 2015 122 188.8; Applicant: GM Global Technology Operations LLC.; 5 pages.

* cited by examiner

*Primary Examiner* — Robert Jones, Jr.
(74) *Attorney, Agent, or Firm* — BrooksGroup

(57) ABSTRACT

A number of variations may include a method that may include providing a composite material that may include nano-tubes that may include pressure activated resin, forming the composite material such that the resin within the nano-tubes may begin to cure, holding the composite material in a formed state, removing the composite material from the formed state, and curing the composite material.

21 Claims, 1 Drawing Sheet

SELF-FIXTURING METALLIC COMPOSITE LAMINATE

TECHNICAL FIELD

The field to which the disclosure generally relates includes composite laminate forming and manufacturing.

BACKGROUND

Composite manufacturing requires curing and autoclave processes which are time and labor intensive. Additionally, post-cure stamping and processing may create post-cure damage to a composite matrix.

SUMMARY OF ILLUSTRATIVE VARIATIONS

A number of variations may include a method that may include providing a composite material that may include tubes that may include pressure activated resin, forming the composite material such that the resin within the tubes may begin to cure, holding the composite material in a formed state, removing the composite material from the formed state, and curing the composite material.

A number of variations may include a product may include a part that may include a composite material that may include nano-tubes that may include pressure activated resin wherein the resin may be cured via a curing process activated by applying pressure or force to the nano-tubes that may include the pressure activated resin.

A number of variations may include a method may include providing a first layer that may include fiber composite material that may include nano-tubes that may include pressure activated resin, a first metallic sheet disposed over the first layer, and a second metallic sheet disposed under the first layer; applying pressure to the first layer, the first metallic sheet, and the second metallic sheet such that the resin within the nano-tubes is activated; forming the first layer, the first metallic sheet, and the second metallic sheet into a first part; holding the first layer, the first metallic sheet, and the second metallic sheet in a green state; curing the first layer; and removing the first metallic sheet and the second metallic sheet from the first layer.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

A part that may include a fiber reinforced composite material may be formed via a stamping or pressing process. The fiber reinforced composite material may include a pressure or force activated resin wherein the fiber reinforced composite material does not cure or harden unless a pressure or force is applied to the fiber reinforced composite material. The fiber reinforced composite material may include fibers and tubes containing pressure or force activated resin. When pressure or force is applied to the fiber reinforced composite material and the tubes, the resin therein may be activated and a curing process may be initiated. Alternatively, a part that may include a fiber reinforced composite material may be formed via a stamping or pressing process wherein a first metallic layer may be disposed over the fiber reinforced composite material and a second metallic layer may be disposed under the fiber reinforced composite material. A stamping or pressing process may be applied to the first metallic layer, the fiber reinforced composite material, and the second metallic layer to activate the resin within the tubes. The first metallic layer and the second metallic layer may be removed from the formed fiber reinforced composite material after curing.

According to one variation, the fiber reinforced composite material may include fibers and the first part of a two part pressure activated epoxy. The fiber reinforced composite material may further include nano-tubes containing the first part, second part, or both parts of a two part pressure activated epoxy. When pressure or force is applied to the fiber reinforced composite material and the nano-tubes, the two parts of a two part pressure activated epoxy therein may be activated and a curing process may be initiated. In this way, a laminar sheet of fiber reinforced composite material may be formed into a complex part wherein curing of the part is activated during the forming process.

Figure 1:
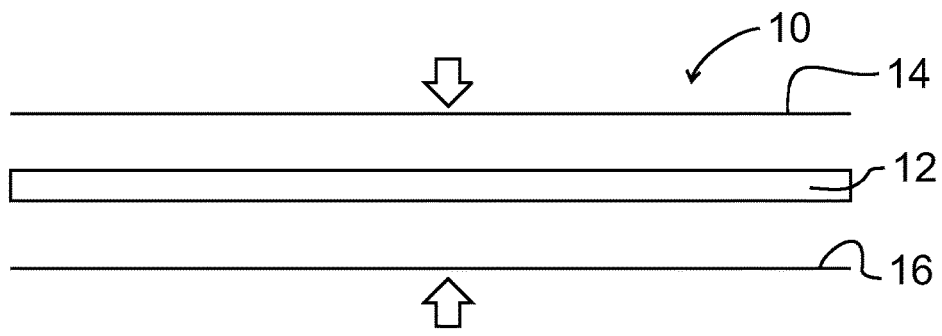
FIG. 1 depicts one variation of a method of forming a fiber reinforced composite material.
Figure 2:
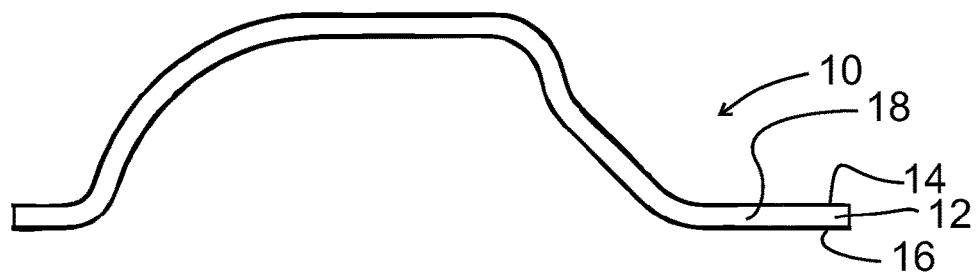
FIG. 2 depicts one variation of a method of forming a fiber reinforced composite material.
Figure 3:
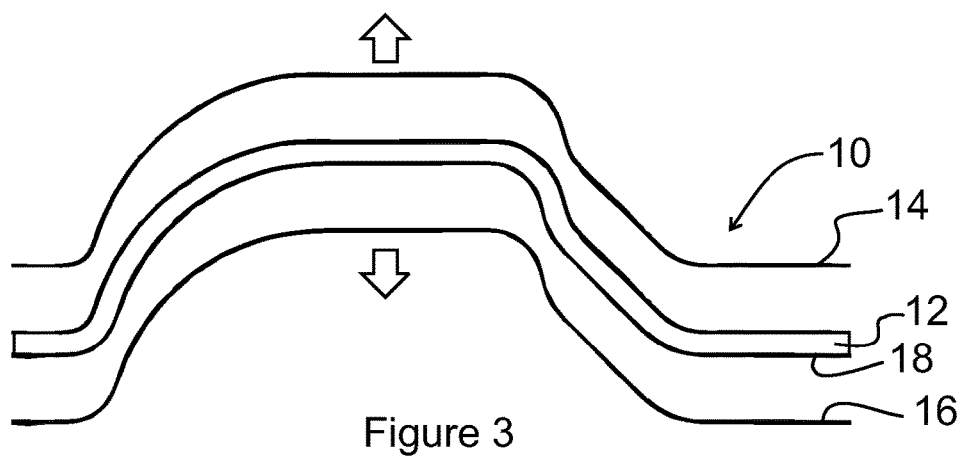
FIG. 3 depicts one variation of a method of forming a fiber reinforced composite material.

Referring to FIGS. 1 through 3, a method 10 of forming a fiber reinforced composite material may include providing a composite material layer 12 that may include tubes that may be nano-tubes including pressure activated resin. The method may include disposing a first metallic layer 14 over the composite material layer 12 and a second metallic layer 16 under the composite material layer 12. The method may further include stamping the composite material layer 12, the first metallic layer 14, and the second metallic layer 16 such that the resin within the tubes begins to cure and part 18 is formed. The method may further including holding the composite material layer 12 within a stamp for a predetermined amount of time and removing the part 18 from the stamp in a green state. The first metallic layer 14 and the second metallic layer 16 may be removed from the part 18 and the method may further include curing the part 18.

According to variation 1, a method may include providing a composite material that may include tubes that may include pressure activated resin, forming the composite material such that the resin within the tubes may begin to cure, holding the composite material in a formed state, removing the composite material from the formed state, and curing the composite material.

Variation 2 may include a method as set forth in variation 1 may further include providing a first metallic sheet disposed over the composite material and a second metallic sheet disposed under the composite material prior to forming the composite material.

Variation 3 may include a method as set forth in variation 2 and may further include providing a first metallic sheet disposed over the composite material and a second metallic sheet disposed under the composite material prior to forming the composite material.

Variation 4 may include a method as set forth in any of variations 2 through 3 and may further include removing the first metallic sheet and the second metallic sheet.

Variation 5 may include a method as set forth in any of variations 1 through 4 wherein the forming may form the composite material into a first part.

Variation 6 may include a method as set forth in any of variations 1 through 5 forming may include stamping.

Variation 7 may include a method as set forth in any of variations 1 through 6 wherein the forming may include applying pressure or force such that the pressure activated resin is activated and curing begins.

Variation 8 may include a method as set forth in any of variations 1 through 7 wherein the holding the composite material in a formed state may include holding the composite material within a stamp.

Variation 9 may include a method as set forth in any of variations 1 through 8 wherein curing the composite material may include keeping the composite material between first metallic sheet and the second metallic sheet and subsequently removing the first metallic sheet and the second metallic sheet.

According to variation 10, a product may include a part that may include a composite material that may include nano-tubes that may include pressure activated resin wherein the resin may be cured via a curing process activated by applying pressure or force to the nano-tubes that may include the pressure activated resin.

Variation 11 may include a product as set forth in variation 10 and may further include a first metallic sheet disposed over the composite material and a second metallic sheet disposed under the composite material Variation 12 may include a product as set forth in any of variations 10 through 11 and may further include a first metallic sheet disposed over the composite material and a second metallic sheet disposed under the composite material.

Variation 13 may include a product as set forth in any of variations 10 through 12 wherein applying pressure or force may include applying pressure or force to the first metallic sheet, second metallic sheet, and composite material.

Variation 14 may include a product as set forth in any of variations 10 through 13 wherein the curing process further may include removing the first metallic sheet and the second metallic sheet.

Variation 15 may include a product as set forth in any of variations 10 through 14 wherein the applying pressure or force forms the composite material into the first part.

Variation 16 may include a product as set forth in any of variations 10 through 15 wherein the applying pressure or force may include stamping.

Variation 17 may include a product as set forth in variation 16 wherein the applying pressure or force may include holding the composite material in a formed state within a stamp.

According to variation 18, a method may include providing a first layer that may include fiber composite material that may include nano-tubes that may include pressure activated resin, a first metallic sheet disposed over the first layer, and a second metallic sheet disposed under the first layer; applying pressure to the first layer, the first metallic sheet, and the second metallic sheet such that the resin within the nano-tubes is activated; forming the first layer, the first metallic sheet, and the second metallic sheet into a first part; holding the first layer, the first metallic sheet, and the second metallic sheet in a green state; curing the first layer; and removing the first metallic sheet and the second metallic sheet from the first layer.

The above description of variations of the invention is merely demonstrative in nature and, thus, variations thereof are not to be regarded as a departure from the spirit and scope of the inventions disclosed within this document.

What is claimed is:

1. A method comprising:
    providing a composite material comprising tubes comprising pressure activated resin;
    forming the composite material such that the resin within the tubes begins to cure;
    holding the composite material in a formed state;
    removing the composite material from the formed state; and
    curing the composite material.

2. The method as set forth in claim 1, further comprising:
    providing a first metallic sheet disposed over the composite material and a second metallic sheet disposed under the composite material prior to forming the composite material.

3. The method as set forth in claim 2, wherein the forming comprises applying pressure to the first metallic sheet, second metallic sheet, and composite material such that the resin within the tubes is activated and the resin begins to cure.

4. The method as set forth in claim 2, further comprising removing the first metallic sheet and the second metallic sheet.

5. The method as set forth in claim 1, wherein the forming forms the composite material into a first part.

6. The method as set forth in claim 1, wherein the forming comprises stamping.

7. The method as set forth in claim 1, wherein the forming comprises applying a pressure or force such that the pressure activated resin is activated and curing begins.

8. The method as set forth in claim 5, wherein the holding the composite material in a formed state comprises holding the composite material within a stamp.

9. The method as set forth in claim 1, wherein curing the composite material comprises keeping the composite material between a first metallic sheet and a second metallic sheet and subsequently removing the first metallic sheet and the second metallic sheet.

10. A product comprising:
    a part comprising a composite material comprising nano-tubes comprising pressure activated resin wherein the resin has been cured via a curing process activated by applying pressure or force to the nano-tubes comprising the pressure activated resin.

11. The product as set forth in claim 10, further comprising: wherein the curing process comprises a first metallic sheet disposed over the composite material and a second metallic sheet disposed under the composite material.

12. The product as set forth in claim 11, wherein applying pressure or force comprises applying pressure or force to the first metallic sheet, second metallic sheet, and composite material.

13. The product as set forth in claim 11, wherein the curing process further comprises removing the first metallic sheet and the second metallic sheet.

14. The product as set forth in claim 10, wherein the applying pressure or force forms the composite material into the first part.

15. The product as set forth in claim 10, wherein the applying pressure or force comprises stamping.

16. The product as set forth in claim 10, wherein the applying pressure or force comprises holding the composite material in a formed state within a stamp.

17. The product as set forth in claim 10, wherein the curing process comprises keeping the composite material between a first metallic sheet and a second metallic sheet and subsequently removing the first metallic sheet and the second metallic sheet.

18. A method comprising:
  providing a first layer comprising fiber composite material comprising tubes comprising a plurality of fibers arranged in a generally tubular shape and having at least two sizings temporarily capping the ends of the tubes and containing pressure activated resin, a first metallic sheet disposed over the first layer, and a second metallic sheet disposed under the first layer;
  applying pressure to the first layer, the first metallic sheet, and the second metallic sheet such that the resin within the tubes is activated;
  forming the first layer, the first metallic sheet, and the second metallic sheet into a first part;
  holding the first layer, the first metallic sheet, and the second metallic sheet in a green state;
  curing the first layer; and
  removing the first metallic sheet and the second metallic sheet from the first layer.

19. The method as set forth in claim 18 wherein the tubes are nano-tubes.

20. The method as set forth in claim 1 wherein the tubes are nano-tubes.

21. The method as set forth in claim 20 wherein the pressure activated resin comprises an epoxy resin having at least two parts.

* * * * *